(12) United States Patent
Kong et al.

(10) Patent No.: US 6,248,442 B1
(45) Date of Patent: Jun. 19, 2001

(54) EASY OPENING HERMETICALLY SEALED FILM

(75) Inventors: Dan-Cheng Kong; Eldridge M. Mount, III; Tien-Kuei Su, all of Fairport, NY (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/224,490

(22) Filed: Dec. 31, 1998

(51) Int. Cl.$^7$ .................................................... B32B 27/32
(52) U.S. Cl. ............................ 428/355 EN; 428/412; 428/421; 428/475.8; 428/476.3; 428/483; 428/516; 428/518; 428/520; 428/511; 428/910; 428/35.2
(58) Field of Search ..................................... 428/516, 518, 428/520, 910, 349, 355 EN, 412, 421, 475.8, 476.3, 483, 511, 34.9, 35.2, 36.6; 525/240

(56) References Cited

U.S. PATENT DOCUMENTS

| | | | |
|---|---|---|---|
| 5,007,143 | 4/1991 | Herrington | 24/400 |
| 5,020,194 | 6/1991 | Herrington et al. | 24/400 |
| 5,055,338 | 10/1991 | Sheth et al. | 428/155 |
| 5,152,613 | 10/1992 | Herrington, Jr. | 383/63 |
| 5,241,030 | 8/1993 | Barry et al. | 526/348.1 |
| 5,278,272 * | 1/1994 | Lai et al. | 526/348.5 |
| 5,530,065 * | 6/1996 | Farley et al. | 525/240 |
| 5,582,923 * | 12/1996 | Kale et al. | 428/523 |
| 5,604,043 * | 2/1997 | Ahlgren | 428/518 |
| 5,814,399 * | 9/1998 | Eichbauer | 428/220 |
| 5,874,139 * | 2/1999 | Bosiers et al. | 428/35.2 |
| 5,885,707 * | 3/1999 | Kaschel et al. | 428/349 |
| 5,919,535 * | 7/1999 | Dombreski et al. | 428/35.2 |
| 5,972,444 * | 10/1999 | Patel et al. | 428/35.2 |

FOREIGN PATENT DOCUMENTS

| | | |
|---|---|---|
| 0 508 165 | 6/1997 | (EP) . |
| 97/22470 | 6/1997 | (WO) . |

OTHER PUBLICATIONS

Brant and Fiscus, "Film Property Enhancements by Orienting Metallocene LLDPE" Exxon Chemical Company, Seventh International Business Forum on Speciality Polyolefins (1997).

* cited by examiner

*Primary Examiner*—Paul Thibodeau
*Assistant Examiner*—D. Lawrence Tarazano
(74) *Attorney, Agent, or Firm*—Dennis P. Santini; T. Dean Simmons

(57) ABSTRACT

The present invention relates to multilayer film which is heat sealable over a broad temperature range. It is desirable to have a broad sealing temperature range to increase the production of packaging machines. The present invention also relates to multilayer film which provides easy opening and hermetic seals to packages. The film is made up of a core layer comprising linear low density polyethylene (LLDPE) and at least one skin layer having a melting point of at least 10° C. below the core layer melting point.

14 Claims, No Drawings

EASY OPENING HERMETICALLY SEALED FILM

BACKGROUND OF THE INVENTION

The present invention relates to a multilayer film which is heat sealable over a broad temperature range. It is desirable to have a broad sealing temperature range to increase the production of packaging machines. The present invention also relates to a multilayer film which provides easy opening and hermetic seals to packages.

Packaging technology has over the years required the development of many disciplines. Currently packaging technologists integrate elements of engineering, chemistry, food science, metallurgy, and other technologies in order to provide the consumer fresh, healthy dry or liquid. food product. In those cases where packages are prepared from multilayer film, it is desirable to be able to provide a hermetic seal, i.e., a seal which does not permit passage of gas, such as air.

Oriented polypropylene films with thin sealable surface layers of ethylene-propylene copolymers or ethylene-propylene-butene-1 terpolymers have been used in packaging operations. However, these films have not yielded hermetic seals on bags made with the films on packaging machines operated at standard conditions. Hermetic seals are required when leak free packaging is important.

Additionally it is also desirable to provide seals which can be readily opened by the consumer without creating a 'z-direction' tear. A z-direction tear is one which cause the disruption of the integrity of the multilayer film when the film is pulled apart at the seal. A z-direction tear is one which does not simply separate at the line at which the seal is formed. Instead, the separation extends to layers of the film when ripped along the layers thereof and not simply delaminated one from another. As a result of z-direction tears, it is difficult to reclose such packages to maintain freshness of the contents. When z-direction tears can be eliminated, packages are easily refolded and sealed by a mechanical means such as a clip Accordingly it is the object of the present invention to provide a film which yields hermetic seals over a broad temperature range and provides easy opening on bags.

It is a further object of the present invention to provide easy opening with directional tear.

It is still a further object to provide re-sealable packaging with a zipper attachment.

SUMMARY OF THE INVENTION

In accordance with the present invention a multilayer film is provided which is hermetically sealable over a broad temperature range. The film comprises a core layer comprising linear low density polyethylene (LLDPE) and at least one skin layer having a melting point of at least 10° C. below the core layer melting point.

DETAILED DESCRIPTION OF THE INVENTION

Hermetic seals as used herein means both peelable and unpeelable seals which provide hermetic barrier properties, i.e., does not premit passage of a gas such as air.

Multi-layer film as used herein means a film having more than one layer of material which forms the final product. Generally, the multilayer film of the present invention is a three or five layer structure.

The core layer comprises conventional (Ziegler Natta-type) LLDPE or a blend of from about 70 to about 99 wt. % conventional LLDPE and from about 1 to about 30 wt. % metallocene produced LLDPE (mLLDPE) having a density in the range of from about 0.91 to about 0.95 $g/cm^3$.

The skin layer(s) comprise a polymer having a melting point of at least 10° C. below the core layer melting point having a density in the range of from about 0.86 to about 0.97 $g/cm^3$. Suitable polymers include polyethylene, ethylene alpha-olefin copolymer ($C_3$–$C_{20}$), metallocene catalyzed polyethylene (mPE) having a density in the range of 0.86 to about 0.902 $g/cm^3$, metallocene catalyzed ethylene alpha-olefin copolymer ($C_3$–$C_{20}$), ethylene-propylene copolymer, ethylene-propylene-butene-1 terpolymer, ethylene-vinyl acetate copolymer, ethylene-acrylic acid copolymer, ethylene-methyl acrylic acid compolymer, or a mixture thereof.

The films employed in the present invention are biaxially oriented. The typical range of orientation is from 1.5 to 8 times, generally 1.5 to 5 times, in the machine direction and 2 to 10 times, generally 3 to 6 times, in the transverse direction. The film thickness can range from about 0.5 mil to about 5.0 mil. It is preferred that the film is coextruded and oriented through the tenter process.

Coextruded biaxially oriented polypropylene (BOPP) film orientation requires machine direction orientation (MDO) roll temperatures above 220° F. (104° C.) for stretching. Therefore low minimum seal temperature (MST) sealants cannot be coextruded due to sealant sticking on the MDO rolls. However, oextruded biaxially oriented LLDPE film can use low MST sealants, such as EVA copolymer and metallocene polyethylene, for MD orientation without sticking problems on the MDO rolls.

The biaxially oriented LLDPE film with low MST sealant can be laminated with BOPP for flexible packaging applications to make low temperature seal and/or increase the packaging speed.

Metallized films are also contemplated. Usually the corona or flame treated film surface is metallized by vacuum deposition of aluminum.

In order to provide a high barrier film with hermetic seals several factors must be considered. It is important to provide a sealing capability at as low a temperature as possible in order to retain among other things stereo regularity imposed during orientation, little or no film shrinkage, retention of film and/or chemical additive properties and highly consistent quality sealing capabilities.

An extrusion processing additive may be added to the core layer to improve extrusion processability, i.e. to reduce the extrusion melt pressure. The extrusion processing aid is in an amount in the range of from about 1 to about 20 wt. %, preferably in the range of from about 5 to about 10 wt. %. Suitable extrusion processing aids include ethylene-propylene copolymer, butylene-propylene copolymer, ethylene-propylene-butene-1 terpolymer, polybutylene and polydimethylsiloxane, or a mixture thereof.

The multilayer films of the present invention may be used in packaging having a zipper closure. U.S. Pat. Nos. 5,152,613; 5,020,194; and 5,007,143, incorporated herein by reference, describe the use of zippers for thermoplastic bags.

Machine direction (MD) unidirectional tear provides easy opening along the tear direction by hand for hermetic seal packaging. The unidirectional tear prevents z-direction tear, which destroys the bag during opening. A reclosable zipper is fastened on the biaxially oriented multilayer films of the present invention during packaging. The reclosable zipper is located inside the bag below the top seal zone or above the bottom seal zone and is in parallel to the top or bottom seal direction. When the bag is opened, the seal zone above the zipper is torn unidirectionally by hand in the bag. The bag can then be resealed with the zipper. Unoriented LLDPE films, such as cast LLDPE or blown LLDPE, do not have unidirectional tear and require a knife or scissors to cut the bag in order to use a recloslable zipper.

The biaxially oriented multilayer films of the present invention may be used in laminate form having an outer web to enhance barrier properties and machinability. The outer web may include paper and mono- and/or multilayer films, including metallized films. Suitable films include oriented polypropylene, ethylene vinyl alcohol copolymer, polyvinyl alcohol, polyvinylidene chloride, polyacrylonitrile copolymer, fluoropolymer, polyethylene terephthalate, polyamide, polyethylene, polyethylene naphthalate, polyester, polycarbonate, or a mixture thereof.

The following examples illustrate the present invention. The following films in Examples 1 to 7 are laminated with a commercial BOPP film and adhesive (MORTON333 adhesive sold by MORTON CHEMICAL). The films are run through a HAYSSEN Vertical Form Fill and Seal packaging machine. Excellent seal ranges are observed as shown in Table 1 below. The packaging speed is 55 packages per minute. The bag size is 5¼ inches by 14 inches. The crimp seal temperature and fin seal temperature are shown in Table 1 below.

EXAMPLE 1

In this example a laminated film structure is prepared from a 3 layer coextruded biaxially oriented film laminated with adhesive to a commercial biaxially oriented polypropylene film (Mobil product 120SPW-L). The 3 layer film is of the structure A/B/C, in which the B core layer of the film is conventional LLDPE having a density of 0.917 (Exxon LL3001), the A skin layer is an ethylene vinyl acetate copolymer with 18% vinyl acetate having a density of 0.94 (DUPONT ELVAX3170SHB) and the C skin layer is an EP-copolymer with 6% ethylene with 2000 ppm silicone sphere and 1000 ppm Siloblock S45 (FINA EOD94-21-12SB). The total film thickness is 110 gauge (27.5 $\mu$m) and each skin layer is 5 gauge (1.25 $\mu$m). The C skin layer is corona treated. The film is oriented 4 times in the MD and 8 times in the TD.

EXAMPLE 2

In this example a laminated film structure is prepared from a 3 layer coextruded biaxially oriented film laminated with adhesive to biaxially oriented polypropylene film. The 3 layer film is of the structure A/B/C, in which the B core layer of the film is conventional LLDPE (ExxonLL3001), the A skin layer is an EVA copolymer with 18% vinyl acetate (DUPONT ELVAX3170SHB) and the C skin layer is an EP-copolymer with 6.5% $C_2$ (FINA EOD94-21-12SB). The total film thickness is 110 gauge (27.5 $\mu$m) and each skin layer is 5 gauge (1.25 $\mu$m). The C skin layer is corona treated. The film is oriented 3 times in the MD and 8 times in the TD.

EXAMPLE 3

In this example a laminated film structure is prepared from a 3 layer coextruded biaxially oriented film laminated with adhesive to biaxially oriented polypropylene film. The 3 layer film is of the structure A/B/C, in which the B core layer of the film is conventional LLDPE (ExxonLL3001), the A skin layer is an EVA copolymer with 18% vinyl acetate (DUPONT ELVAX3170SHB) and the C skin layer is an EP-copolymer with 6.5% $C_2$ (FINA EOD94-21-12SB). The total film thickness is 110 gauge (27.5 $\mu$m) and each skin layer is 5 gauge (1.25 $\mu$m). The C skin layer is corona treated. The film is oriented 2 times in the MD and 8 times in the TD.

EXAMPLE 4

In this example a laminated film structure is prepared from a 3 layer coextruded biaxially oriented film laminated with adhesive to biaxially oriented polypropylene film. The 3 layer film is of the structure A/B/C, in which the B core layer of the film is conventional LLDPE (ExxonLL3001), the A skin layer is an EVA copolymer with 18% vinyl acetate (DUPONT ELVAX3170SHB) and the C skin layer is an EP-copolymer with 6.5% $C_2$ (FINA EOD94-21-12SB). The total film thickness is 110 gauge (27.5 $\mu$m) and each skin layer is 5 gauge (1.25 $\mu$m). The C skin layer is corona treated. The film is oriented 1.5 times in the MD and 8 times in the ID.

EXAMPLE 5

In this example a laminated film structure is prepared from a 3 layer coextruded biaxially oriented film laminated with adhesive to biaxially oriented polypropylene film. The 3 layer film is of the structure A/B/C, in which the B core layer of the film is conventional LLDPE (ExxonLL3001), the A skin layer is an EVA copolymer with 18% vinyl acetate (DUPONT ELVAX3170SHB) and the C skin layer is an EP-copolymer with 6.5% $C_2$ (FINA EOD94-21-12SB). The total film thickness is 110 gauge (27.5 $\mu$m) and each skin layer is 5 gauge (1.25 $\mu$m). The C skin layer is corona treated. The film is oriented 4 times in the MD and 7 times in the TD.

EXAMPLE 6

In this example a laminated film structure is prepared from a 3 layer coextruded biaxially oriented film laminated with adhesive to biaxially oriented polypropylene film. The 3 layer film is of the structure A/B/C, in which the B core layer of the film is conventional LLDPE (ExxonLL3001), the A and C skin layers are metallocene catalyzed ethylene-octene copolymer with density 0.909 (DOW AFFINITY PL1840). The total film thickness is 95 gauge (23.75 $\mu$m) and each skin layer is 5 gauge (1.25 $\mu$m). The C skin layer is corona treated. The film is oriented 4 times in the MD and 6 times in the TD.

EXAMPLE 7

In this example a laminated film structure is prepared from a commercial biaxially oriented polypropylene film (Mobil product 90SPW-L) laminated with adhesive to a commercial biaxially oriented polypropylene film (Mobil product BSR).

TABLE 1

| Example No. | Crimp Seal Temperature Range | Fin Seal Temperature Range |
| --- | --- | --- |
| 1 | 140° F. | 100° F. |
| 2 | 140° F. | 100° F. |
| 3 | 140° F. | 100° F. |
| 4 | 140° F. | 100° F. |

TABLE 1-continued

| Example No. | Crimp Seal Temperature Range | Fin Seal Temperature Range |
|---|---|---|
| 5 | 140° F. | 90° F. |
| 6 | 90° F. | 90° F. |
| 7 | 80° F. | 70° F. |

In Examples 8–20, biaxially oriented LLDPE (BO-LLDPE) films are laminated with heat resistant outer webs and evaluated through three packaging machines. The packaging machines used for evaluation are VFF&S (HAYSSEN), HFF&S (DOBOY) and HFF&S Pouch (BARTELT). Hermetic seals are observed using the underwater vacuum method at 10 inches mercury vacuum.

EXAMPLE 8

In this example a laminated film structure is prepared from a 3 layer coextruded biaxially oriented film laminated with polyethylene to a 38 gauge (9.5 μm) polyester film. The 3 layer film is of the structure A/B/C, in which the B core layer of the film is a blend of LLDPE having a density of 0.92 ,(DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 100 gauge (25μm) and each skin layer is 5 gauge (1.25 μm). The A skin layer is corona treated. The film is oriented 4 times in the MD and 6 times in the TD.

EXAMPLE 9

In this example a laminated film structure is prepared from a 3 layer coextruded biaxially oriented film laminated with adhesive to a 38 gauge (9.5 μm) polyester film. The 3 layer film is of the structure A/B/C, in which the B core layer of the film is a blend of LLDPE having a density of 0.92 DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 100 gauge (25 μm) and each skin layer is 5 gauge (1.25 μm). The A skin layer is corona treated. The film is oriented 4 times in the MD and 6 times in the TD.

EXAMPLE 10

In this example a laminated film structure is prepared from a 3 layer coextruded biaxially oriented film laminated with polyethylene to a 38 gauge (9.5 μm) polyester film. The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 90 (22.5 μm) gauge and each skin layer is 5 gauge (1.25 μm). The A skin layer is corona treated. The film is oriented 4 times in the MD and 6 times in the TD.

EXAMPLE 11

In this example a laminated film structure is prepared from a 3 layer coextruded biaxially oriented film laminated with adhesive to a 38 gauge (9.5 μm) polyester film. The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm, TOSPEARL, 1000 ppm SILOBLOCK S45 and 2000 ppm KEM-E. The total film thickness is 90 gauge (22.5 μm) and each skin layer is 5 gauge (1.25 μm). The A skin layer is corona treated. The film is oriented 4 times in the MD and 6 times in the TD.

EXAMPLE 12

In this example a laminated film structure is prepared from a 3 layer coextruded biaxially oriented film laminated with polyethylene to a 38 gauge (9.5 μm) polyester film. The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and, the C skin layer is metallocene PE (EXACT 3131) with 2000 ppm TOSPEARL, 1000 ppm SILOBLOCK S545 and 2000 ppm KEM-E. The total film thickness is 80 gauge (20 μm) and each skin layer is 5 gauge (1.25 μm). The A skin layer is corona treated. The film is oriented 4 times in the MD and 6 times in the TD.

EXAMPLE 13

In this example a laminated film structure is prepared from a 3 layer coextruded biaxially oriented film laminated with adhesive to a 38 gauge (9.5 μm) polyester film. The 3 layer film is of the structure A/B/C, in which the B core layer of the film is a blend of LLDPE having a density of $0.929/cm^3$ (DOW 2045A) and EP copolymer in a ratio of 95:5, the A skin layer is a blend of LLDPE having a density of (DOW 2045A) and EP copolymer in a ratio of 80:20, and the C skin layer is metallocene PE (EXACT 3131) with 2000 ppm TOSPEARL, 1000 ppm SILOBLOCK and 2000 ppm KEM-E. The total film thickness is 80 gauge (20 μm) and each skin layer is 5 gauge (1.25 μm). The A skin layer is corona treated. The film is oriented 4 times in the MD and 6 times in the TD.

The BO-LLDPE films of Examples 8–13 are evaluated using a DOBOY at a speed of 86 fpm resulting in a broad hermetic seal window as shown below in Table 2.

TABLE 2

| Laminate Structure Example No | Crimp Seal Temperature Range (Hermetic Seal) |
|---|---|
| Example 9 | 310° F. to 420° F. |
| Example 10 | 340° F. to 420° F. |
| Example 11 | 300° F. to 420° F. |
| Example 12 | 340° F. to 420° F. |
| Example 13 | 300° F. to 420° F. |
| Packaging Speed: 86 fpm | |
| Bag Length: 6" | |
| Fin Wheel: 350 F | |

The BO-LLDPE films of Examples 8–13 are also laminated to an oriented polypropylene film product (Mobil 70 SPW-L) and evaluated using a HAYSSEN at a speed of 55 ppm resulting in broad hermetic seal windows as shown below in Tables 3–8.

EXAMPLE 14

In this example a laminated film structure is prepared from a 3 layer coextruded biaxially oriented film laminated with polyethylene to an oriented polypropylene film (Mobil product 70 SPW-L). The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 100 gauge (25 μm) and each skin layer is 5 gauge (1.25 μm). The A skin layer is corona treated. The film is oriented 4 times in the MD and 6 times in the TD.

EXAMPLE 15

In this example a laminated film structure is prepared from a 3 layer coextruded biaxially oriented film laminated with adhesive to an oriented polypropylene film (Mobil product 70 SPW-L). The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 100 gauge (25 μm) and each skin layer is 5 gauge (1.25 μm). The A skin layer is corona treated. The film is oriented 4 times in the MD and 6 times in the TD.

EXAMPLE 16

In this example a laminated film structure is prepared from a 3 layer coextruded biaxially oriented film laminated with polyethylene to an oriented polypropylene film (Mobil product 70 SPW-L). The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 90 gauge (22.5 μm) and each skin layer is 5 gauge (1.25 μm). The A skin layer is corona treated. The film is oriented 4 times in the MD and 6 times in the TD.

EXAMPLE 17

In this example a laminated film structure is prepared from a 3 layer coextruded biaxially oriented film laminated with adhesive to an oriented polypropylene film (Mobil product 70 SPW-L). The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm Siloblock S45 and 2000 ppm Kem-E. The total film thickness is 90 gauge (22.5 μm) and each skin layer is 5 gauge (1.25 μm). The A skin layer is corona treated. The film is oriented 4 times in the MD and 6 times in the TD.

EXAMPLE 18

In this example a laminated film structure is prepared from a 3 layer coextruded biaxially oriented film laminated with polyethylene to an oriented polypropylene film (Mobil product 70 SPW-L). The 3 layer film is of the structure A/B/C, in which the B core layer of the film is a blend of LLDPE having a density of 0.92 (DOWLEX 2045A) and EP copolymer in a ratio of 95:5, the A skin layer is a blend of LLDPE having a density of 0.92 (DOWLEX 2045A) and EP copolymer in a ratio of 80:20, and the C skin layer is metallocene PE (EXACT 3131) with 2000 ppm TOSPEARL, 1000 ppm SILOBLOCK S45 and 2000 ppm KEM-E. The total film thickness is 80 gauge (20 μm) and each skin layer is 5 gauge (1.25 μm). The A skin layer is corona treated. The film is oriented 4 times in the MD and 6 times in the TD.

EXAMPLE 19

In this example a laminated film structure is prepared from a 3 layer coextruded biaxially oriented film laminated with adhesive to an oriented polypropylene film (Mobil product 70 SPW-L). The 3 layer film is of the structure A/B/C, in which the B core layer of the film is a blend of LLDPE having a density of (DOW 2045A) and EP copolymer in a ratio of 95:5, the A skin layer is a blend of LLDPE having a density of 0.92 (DOW 2045A) and EP copolymer in a ratio of 80:20, and the C skin layer is metallocene PE (EXACT 3131) with 2000 ppm TOSPEARL, 1000 ppm SILOBLOCK and 2000 ppm KEM-E. The total film thickness is 80 gauge(20 μm) and each skin layer is 5 gauge (1.25 μm). The A skin layer is corona treated. The film is oriented 4 times in the MD and 6 times in the TD.

TABLE 3

| | | Crimp Seal Temperature Example 14 | | | |
|---|---|---|---|---|---|
| | | 250° F. | 270° F. | 290° F. | 310° F. |
| F I N | 330° F. | No Leak | No Leak | No Leak | No Leak |
| | 310° F. | No Leak | No Leak | No Leak | No Leak |
| | 290° F. | Leak | No Leak | No Leak | No Leak |
| S E A L | 270° F. | Leak | Leak | No Leak | No Leak |
| | 250° F. | Leak | Leak | Leak | No Leak |
| | 230° F. | Leak | Leak | Leak | No Leak |

TABLE 4

Crimp Seal Temperature
Example 15

|   | 250° F. | 270° F. | 290° F. | 310° F. |
|---|---------|---------|---------|---------|
| 330° F. | Leak | No Leak | No Leak | No Leak |
| 310° F. |      | Leak    | No Leak | No Leak |
| 290° F. |      | Leak    | Leak    | No Leak |
| 270° F. |      | Leak    | Leak    | No Leak |
| 250° F. |      | Leak    | Leak    | Leak    |

TABLE 5

Crimp Seal Temperature
Example 16

|   | 250° F. | 270° F. | 290° F. | 310° F. |
|---|---------|---------|---------|---------|
| 330° F. | Leak | No Leak | No Leak | No Leak |
| 310° F. | Leak | No Leak | No Leak | No Leak |
| 290° F. | Leak | No Leak | No Leak | No Leak |
| 270° F. | Leak | No Leak | No Leak | No Leak |
| 250° F. | Leak | Leak    | Leak    | No Leak |

TABLE 6

Crimp Seal Temperature
Example 17

|   | 250° F. | 270° F. | 290° F. | 310° F. |
|---|---------|---------|---------|---------|
| 330° F. | Leak | No Leak | No Leak | No Leak |
| 310° F. | Leak | Leak    | No Leak | No Leak |
| 290° F. | Leak | Leak    | No Leak | No Leak |
| 270° F. | Leak | Leak    | No Leak | No Leak |
| 250° F. | Leak | Leak    | Leak    | Leak    |

TABLE 7

Crimp Seal Temperature
Example 18

|   | 250° F. | 270° F. | 290° F. | 310° F. |
|---|---------|---------|---------|---------|
| 330° F. | Leak | No Leak | No Leak | No Leak |
| 310° F. | Leak | No Leak | No Leak | No Leak |
| 290° F. | Leak | No Leak | No Leak | No Leak |
| 270° F. | Leak | No Leak | No Leak | No Leak |
| 250° F. | Leak | Leak    | Leak    | Leak    |

TABLE 8

Crimp Seal Temperature
Example 19

|   | 250° F. | 270° F. | 290° F. | 310° F. |
|---|---------|---------|---------|---------|
| 330° F. | Leak | No Leak | No Leak | No Leak |
| 310° F. | Leak | No Leak | No Leak | No Leak |
| 290° F. | Leak | No Leak | No Leak | No Leak |
| 270° F. | Leak | Leak    | No Leak | No Leak |
| 250° F. | Leak | Leak    | Leak    | Leak    |

EXAMPLE 20

In this example a laminated film structure is prepared from a 5 layer coextruded biaxially oriented film laminated with polyethylene to a 48 gauge (12 μm) polyester film. The 5 layer film is of the structure A/D/B/E/C, in which the B core layer is LLDPE (DOW 2045A), the A skin layer is metallocene PE (AFFINITY 1845) with 2000 ppm TOSPEARL, 1000 ppm SILOBLOCK S45 and 2000 ppm KEM-E, and the C skin layer is metallocene PE (AFFINITY 1845) with 2000 ppm TOSPEARL, 1000 ppm SILOBLOCK S45 and 2000 ppm KEM-E. The D and E intermediate layers are a blend of (LL3002) and metallocene PE (AFFINITY 1845) in a ratio of 70:30. The total film thickness is 200 gauge (50 μm), each intermediate layer is 20 gauge (5 μm) and each skin layer is 5 gauge (1.25 μm). The C skin layer is corona treated. The film is oriented 4 times in the MD and 6 times in the TD. Good seal integrity is observed using the Bartelt at a packaging speed of 70 ppm as shown below in Table 9.

TABLE 9

| Side Seal | Bottom Seal | Seal Performance |
|-----------|-------------|------------------|
| 210° F.   | 230° F.     | Light Tack Seal; Good Cuttability |
| 220° F.   | 230° F.     | Peelable Seal; Good Cuttability |
| 230° F.   | 230° F.     | Fusion Seal; Good Cuttability |
| 250° F.   | 230° F.     | Fusion Seal; Good Cuttability |
| 290° F.   | 230° F.     | Fusion Seal; Good Cuttability |
| 300° F.   | 230° F.     | Fusion Seal; Good Cuttability |
| 300° F.   | 250° F.     | Fusion Seal; Fair Cuttability |
| 310° F.   | 250° F.     | Fusion Seal; Poor Cutting |
| 330° F.   | 250° F.     | Fusion Seal; Poor Cutting |

What is claimed is:

1. A biaxially oriented multilayer film for packaging which comprises:
    (a) a core layer comprising from about 70 to 99 wt % Ziegler Natta catalyzed linear low density polyethylene and from about 1 to about 30 wt % single site catalyzed linear low density polyethylene; and
    (b) at least one skin layer comprising an ethylene polymer and/or copolymer having a density range of from about 0.86 to about 0.97 g/cm$^3$, wherein the core layer further comprises an extrusion processing additive selected from the group consisting of ethylene-propylene copolymer, butylene-propylene copolymer, ethylene-propylene-butylene terpolymer, polybutylene and polydimethylsiloxane, and mixtures thereof.

2. The biaxially oriented multilayer film according to claim 1, wherein said extrusion processing aid is in an amount in the range of about 1 to about 20 wt. %.

3. The biaxially oriented multilayer film according to claim 2, wherein said extrusion processing aid is in an amount in the range of from about 5 to about 10 wt. %.

4. A biaxially oriented multilayer film according to claim 1, wherein said skin layer is selected from the group consisting of polyethylene, ethylene alpha-olefin copolymer, metallocene catalyzed polyethylene, metallocene catalyzed ethylene alpha-olefin copolymer, ethylene-propylene copolymer, ethylene-propylene-butene-1 terpolymer, ethylene-vinyl acetate copolymer, ethylene acrylic acid copolymer, ethylene-methyl acrylic acid copolymer and mixtures thereof.

5. A biaxially oriented multilayer film according to claim 1, wherein said film is metallized.

6. A biaxially oriented multilayer film according to claim 1, wherein said film is oriented from 1.5 to about 5 times in the machine direction and from 3 to about 6 times in the transverse direction.

7. A biaxially oriented multilayer film according to claim 1, wherein said skin layer comprises ethylene-propylene copolymer.

8. A biaxially oriented multilayer film according to claim 1, wherein said Ziegler-Natta catalyzed linear low density polyethylene has a density in the range of from about 0.91 to about 0.95 /g/cm$^3$.

9. A biaxially oriented multilayer film according to claim 1, wherein said film is oriented through a tenter frame process.

10. A biaxially oriented multilayer film according to claim 1, having a directional tearability in the machine direction.

11. A laminate film structure, comprising a first film laminated to a second film, wherein said first film is a biaxially oriented multilayer film according to claim 1, and said second film is an outer web selected from the group consisting of paper, oriented polypropylene, ethylene vinyl alcohol copolymer, polyvinyl alcohol, polyvinylidene chloride, polyacrylonitrile copolymer, fluoropolymer, polyethylene terephthalate, polyamide, polyethylene, polyethylene naphthalate, polyester, polycarbonates and mixtures thereof.

12. A laminate film structure according to claim 4, wherein said structure has a fin seal temperature range above about 70° F.

13. A laminate film structure according to claim 11, having a reclosable fastener.

14. A laminate film structure according to claim 11, wherein the structure is hermetically sealable.

* * * * *